United States Patent [19]
Luke et al.

[11] Patent Number: 6,137,573
[45] Date of Patent: Oct. 24, 2000

[54] SENSOR SYSTEM

[75] Inventors: David G Luke; Roy McBride, both of Edinburgh; Peter A Lloyd, Farnborough; James G Burnett; Alan H Greenaway, both of Malvern; Julian D C Jones, Edinburgh, all of United Kingdom

[73] Assignee: The Secretary of State for Defence in Her Britannic Majesty's Government of the United Kingdom of Great Britain and Northern Ireland, Farnborough, United Kingdom

[21] Appl. No.: 09/142,860
[22] PCT Filed: Mar. 24, 1997
[86] PCT No.: PCT/GB97/00807
  § 371 Date: Sep. 16, 1998
  § 102(e) Date: Sep. 16, 1998
[87] PCT Pub. No.: WO97/37197
  PCT Pub. Date: Oct. 9, 1997

[30] Foreign Application Priority Data

Mar. 29, 1996 [GB] United Kingdom .................. 9606785

[51] Int. Cl.$^7$ ........................................... G10D 9/02
[52] U.S. Cl. ............................... 356/351; 356/345
[58] Field of Search .................. 356/345, 351, 356/365, 361

[56] References Cited

FOREIGN PATENT DOCUMENTS

WO 95 02802  1/1995  WIPO.

OTHER PUBLICATIONS

Optics Letters, vol. 19, No. 24, Dec. 1994, Washington US, pp. 2164–2166, XP000485818 V.Gusmeroli et al.: "Nonincremental interferometric fiber–optic measurement method for simultaneous detection of temperature and strain" see the whole document.

Proceedings of the SPIE, vol. 2861, Aug. 8–9, 1996, Denver, Colorado, pp. 26–31, XP000676843 D.G. Luke et al.: "Composite–embedded highly–birefringent optical fibre strain guage with zero thermal–apparent strain" see the whole document.

Optics Letters, vol. 19, No. 24, Dec. 15, 1994, Washington US, pp. 2167–2169, XP000485819 D.A. Flavin et al.: "Combined temperature and strain measurement with a dispersive optical fiber Fourier–transform spectrometer" see the whole document.

Optics Letters, vol. 20, No. 3, Feb. 1, 1995, Washington US, pp. 333–335, XP000482486 Sotiris E. Kanellopoulos et al.: Simultaneous strain and temperature sensing with photogenerated in–fiber gratings: see the whole document.

Proceedings of the SPIE, vol. 1367, Sep. 17–19, 1990, San Jose, California, pp. 249–260, XP000676040 Ashish M. Vengsarkar et al.: "Fiber optic sensor for simultaneous measurement of strain and temperature" see the whole document.

*Primary Examiner*—Robert H. Kim
*Assistant Examiner*—Andrew H. Lee
*Attorney, Agent, or Firm*—Nixon & Vanderhye P.C.

[57] ABSTRACT

A sensor system (10) incorporating an interferometer operates as an optical strain gauge. The system (10) is arranged to generate interferograms characterised by an optical path difference between light traversing a sensor arm (12) of the interferometer and light traversing a reference arm (58). Each arm incorporates a highly birefringent optical fibre (38, 58) capable of supporting light propagation at two velocities in two different polarisation modes. A first interferogram is generated between light coupled into the fast eigenmodes of each fibre and a second is generated between light coupled into the slow eigenmodes. Mean optical group delay ($\tau_{MGD}$) and differential optical group delay ($\tau_{DGD}$) of these interferograms are affected differently by temperature and strain and thus provide a means of discriminating between these attributes of the sensor environment. Thus simultaneous measurement of strain and temperature is achieved.

33 Claims, 8 Drawing Sheets

SENSOR SYSTEM

This invention relates to a sensor system for measuring strain and temperature.

Optical fibre sensors are known in the prior art. They employ optical fibres to guide light which becomes modulated in response to external influences such as strain and temperature acting on the fibres. Information contained in these modulations may be extracted by interferometric means. This is particularly attractive for accurate applications as the phase sensitivity of optical fibres to physical influences such as strain and temperature is high.

The fundamental problem of strain and temperature measurement by optical means is one of deconvolving the contributions from each parameter. Moreover, a further problem may arise in monochromatic interferometry because phase differences of multiplies of $2\pi$ are lost. This latter situation is known as phase ambiguity.

Light propagating along a fibre will traverse it in a time $\Delta\tau$ which is dependent on the optical path length (OPL) of the fibre. The OPL is defined as the physical length of the fibre multiplied by the refractive index at the wavelength of light propagating therein. Thus physical influences acting to change the OPL of a fibre may affect one or both of the fibre length or refractive index.

Strain in an optical fibre may arise from, among other factors, stress (elasticity) or an electric field (piezoelectricity). In any case the external influence causes displacement of points in a body with magnitude and orientation dependent on position within the body. In general, the strain induced is determined by the magnitude and orientation of the influence as well as by the physical properties and symmetry of the material. The physical distortion within a strained material alters both its physical and electronic structure and hence affects its optical properties. In particular a longitudinal strain component, defined to be parallel to the length of an optical fibre (and hence propagation direction of light therein), will lengthen the fibre inducing a change in OPL via physical length. Transverse components however can only affect the OPL through a change in electronic structure and hence birefringence of the material.

The refractive index of an unconstrained, bare fibre is temperature dependent and so heating such a fibre will result in a change in OPL. The thermal expansion of optical fibre material (typically fused silica) is low and any consequent change in OPL through a change in fibre length will be negligible. The cross-sensitivity of temperature and strain both affecting the OPL in a bare-fibre case is of the order 10 microstrain per Kelvin. An optical fibre embedded within a host material will however be affected by the thermal expansion of the host material. Differing thermal expansivities of host and embedded fibre will result in the host extending a stress on the fibre. Such a fibre used as a sensor will therefore indicate a fictitious strain, due to temperature change, in the absence of an applied stress. This indicated strain is known as the thermal-apparent strain of the sensor.

Despite allowance made for host thermal expansion, a sensor constructed from an embedded fibre will still exhibit temperature cross-sensitivity which restricts its use to environments with known temperatures or to situations of time-varying stresses.

Temperature-independent strain measurement has important applications in the construction and engineering industries. Civil engineering requires strains within buildings to be monitored over time and higher accuracy sensors are required for the high tech construction industry e.g. aeroplanes, helicopters and space equipment. For example, it is important in the aircraft industry to determine the operating strains experienced by panels of aircraft fuselage. One fibre arm of an interferometer embedded in a panel enables strains in that panel to be monitored over its life. Furthermore a sensor arm subdivided into a series of sensor elements by a series of partially-reflective mirrors enables the strain experienced by each sensor element to be determined.

However there exists a fundamental problem in deconvolving the contributions to a measured optical effect from strain and temperature, including the indirect effects of stress exerted via thermal expansion of a host material.

The prior art records a number of temperature-independent strain sensors. Such sensors suffer from various disadvantages: they may only be capable of measuring changes in strain and temperature, they may not be sufficiently sensitive for high accuracy applications or they may suffer from phase ambiguity because of the need to use monochromatic light in forming interference fringes.

Temperature-insensitive strain sensors are reported by R. O. Claus et al., Smart Materials and Structures; 1, 237–242, (1992) but these do not compensate for thermal expansion of the host material. Electrical strain gauges are manufactured to be temperature-compensated for a specific host material, but this approach is unattractive for composite materials for which the large range of thermal expansion coefficients would require a correspondingly large range of matching strain gauges.

Composite materials may be used if strain and temperature are measured simultaneously. In this way, knowledge of the host's thermal expansion coefficient allows thermal cross-sensitivity and thermal-apparent strain to be cancelled out. The relationship between the fibre strain $\epsilon_f$ and the host strain $\epsilon_h$ can be assumed to be a linear relationship for small changes in temperature:

$$\begin{pmatrix} \varepsilon_f \\ T_f \end{pmatrix} = \begin{pmatrix} 1 & a_T \\ 0 & 1 \end{pmatrix} \begin{pmatrix} \varepsilon_h \\ T_h \end{pmatrix}$$

where $T_f$ and $T_h$ are the fibre and host temperatures respectively and good strain coupling is assumed between sensor and host material. The parameter $a_T$ is due to the difference in thermal coefficients of the two materials and can be measured for a specific host material. If thermal cross-sensitivity is calibrated out by a simultaneous measurement of $\epsilon_f$ and $T_f$, then the parameters of the sensor environment, $\epsilon_h$ and $T_h$, can be derived from the relationship above which accounts for thermal-apparent strain. The principal problem in measuring $\epsilon_f$ and $T_f$ lies in finding optical effects for which the ratio of strain-dependent changes to temperature-dependent changes is sufficiently different to enable satisfactory discrimination between strain and temperature to be made.

The prior art records a number of attempts to achieve an acceptable degree of discrimination between temperature and strain.

F. Farahi et al., Journal of Lightwave Technology 8(2), 138–142 (1990) measured the phases at the combined output of a polarimetric and interferometric fibre device for two polarisation modes of an optical fibre sensor. A. M. Vengsarkar et al., Proc SPIE 1367, 249–260, (1990) disclose a sensor comprising a dual-mode elliptical core fibre guiding light beams of two different wavelengths. In these cases the effects of strain and temperature on the light as it passes through the optical fibre sensor are different for the two polarisation modes or at the two different wavelengths and so the relative contributions can be deconvolved. However discrimination was found to be poor and the relative insensitivity of polarisation to environmental changes makes device based on polarisation less sensitive than interferometric devices.

Dunphy and Meltz in "Optical Fibre Sensor Development for Turbine Applications" A1AA-89-2914, 25th Joint Propulsion Conference p3156, disclose discrimination provided by two fundamental modes of a twin-core optical fibre. Temperature and strain change the length of the fibre and also the beat length. Simultaneous operation of the calibrated device at two different wavelengths enables the strain and temperature experienced by the sensor to be calculated. However twin-cored fibres are non-standard and consequently expensive. This device also suffers from phase ambiguity over temperature ranges greater than its dynamic range.

U.S. Pat. No. 5,399,854 discloses mean and differential wavelength reflected from a birefringent reflective element such as a Bragg grating in an optical fibre as discriminators. They are arranged however to provide only a measure of temperature and strain variation, reference conditions are required to derive absolute values. The fibre is embedded in an arrangement of layers comprising carbon fibre filaments woven through a resin. This ensures that a general applied strain will have unequal transverse components which induces birefringence at the grating region in the optical fibre. The longitudinal strain component changes the periodicity of the grating. Thus in a general stressed environment at a particular temperature two characteristic wavelengths from a white light source simultaneously satisfy the grating equation and are reflected. The mean reflected wavelength and wavelength separation are affected differently by variations in strain and temperature. This method is however less accurate than interferometric methods—the shifts observed are relatively insensitive to changes in environmental conditions and so uncertainties are correspondingly large.

A method of providing simultaneous measurement of variations in temperature and strain is disclosed in European Patent Application 0 564 034. Interferograms are developed centred on three different wavelengths filtered from a broadband source. Each interferogram is dependent on the optical path imbalance between the two arms of an interferometer. Neighbouring interferograms are then compared to yield two phase differences containing information concerning the physical length difference, elongation and temperature difference between sensor and reference fibres. Wavelength and dispersion can be derived from these phase differences and fibre elongation and temperature change extracted. Elongation and temperature are measured at the sensor fibre (in one interferometer arm) relative to conditions at the reference fibre (in the second interferometer arm). However dispersion measurements require radiation from a broadband source to be coupled into a single fibre mode. This is difficult to achieve with sufficient optical power to allow accurate measurement.

PCT patent application PCT/GB94/01388 discloses an interferometric sensor based on discrimination by measurement of group delay and dispersion. A broadband interferogram is generated as the optical path length of a reference arm is scanned across that of a sensor arm. The variation of phase with frequency across the interferogram is extracted by Fast Fourier Transform. From this phase relationship, the change in group velocity and dispersion relative to a previous interferogram can be deduced. If the one interferogram is generated under known conditions of temperature and strain then the measured modifications to group velocity and dispersion can be used to derive unique values of the change in temperature and strain relative to the previous known conditions. However, this technique requires a source of very broad spectral width (at least 100 nm) in order to measure dispersion.

A non-interferometric approach is disclosed in patent application GB 2 224 566A. The resonance condition in a fibre loop is monitored in order to derive OPL information. Two coincident optical paths of different OPL are maintained in the loop by the use of a high birefringence fibre which supports two modes of light propagation termed "fast" and "slow". The frequency of a laser source is swept across a range covering several free spectral ranges of the resonator. Dips in the transmitted intensity will occur whenever one or other of the optical paths satisfies the resonance condition. OPLs can be extracted from the resonance information and changes in temperature and strain are reflected in modifications to the two optical paths. Temperature and strain can be extracted from the changes in OPLs and so deduced relative to previous known conditions.

It is an object of this invention to provide an alternative form of optical fibre sensor system.

The present invention provides a sensor system including interferometric means incorporating sensor and reference elements arranged to receive broadband radiation, means for introducing a variation in optical path difference between a first optical path incorporating the reference element and a second optical path incorporating the sensor element, means for combining the light from the first and second optical paths to form interferograms and signal processing means to process interferogram information characterised in that the sensor and reference elements are each arranged to support at least two different eigenmodes of radiation; the sensor system is arranged to generate at least two interferograms therefrom; and the signal processing means are arranged to extract optical group delay information from the interferograms and to derive temperature and/or strain data therefrom.

The invention provides the advantage of capability for discriminating between temperature and strain. This is because the different eigenmodes supported by the sensor element are affected differently by temperature and stress in the sensor environment. It overcomes a limitation of many prior art interferometric strain sensors in that such discrimination is achievable only by extracting a time-varying component or by subtracting a determinable thermal effect from an overall optical signal. This limits such prior art sensors to use in environments with time-varying stresses or with known temperatures. Furthermore the discrimination achievable by group delay measurement improves on that provided by prior art sensors which extract a simultaneous measurement of temperature and strain from other quantities.

In a preferred embodiment the signal processing means is arranged to extract optical group delay information from the interferograms and to derive temperature and/or strain data from mean optical group delay and differential optical group delay obtained from the extracted interferogram information.

This provides the advantage of ease of operation in that optical group delay is a readily extractable quantity from interferometric data. It also provides for exploitation of a consequence of using a broadband source in an interferometer with more than two distinct optical paths. Not only does a broadband source enable elimination of the phase ambiguity inherent in monochromatic fringes but its short coherence length also encourage formation of discrete interferograms generated from the different combinations of optical paths. Such discrete interferograms simplify the measurement of each interferogram group delay. Strain and temperature produce different effects on the individual sensor (and reference) eigenmodes, which are evidenced in optical group delays of interferograms formed from light propagating in individual eigenmodes. Extracting mean and differential group delay, as opposed to just group delay, enables the extracted information to be limited to group delay and not derivatives thereof e.g. dispersion. A prior art device depended on the more complex derivation of group delay and dispersion from a single interferogram, with consequent stringent requirements on source spectral width.

The sensor system is preferably arranged such that the sensor and reference elements each comprise an optical fibre which provides an optical path therein. Moreover each optical fibre is preferably birefringent to establish two eigenmodes per fibre and to constrain radiation to propagate in not more than two polarisation eigenmodes of the fibre.

The optical fibres preferably exhibit high, stress-induced birefringence (HiBi). This provides a means for sensitive discrimination between the effects of strain and temperature on fibre optical properties. A change in temperature modifies induced stresses in a HiBi fibre and so affects its birefringence. High birefringence shields the fibre from transverse stresses and so is substantially unaffected by stress. Thus both strain and temperature modify the length of the fibre, the latter primarily through thermal-apparent strain, whereas only temperature affects the birefringence. Determination of these unequally-affected parameters allows discrimination between the effects of temperature and strain. A further advantage of using HiBi fibres is that the high birefringence substantially maintains the polarisation state of radiation propagating therein regardless of external environmental variation (within reasonable limits).

The sensor optical fibre may be embedded within a composite material, in order to communicate strain within the composite material to the optical fibre.

The sensor system is preferably arranged such that the reference element and means for introducing a variation in optical path difference are located in separate arms of an unbalanced Michelson interferometer. The sensor element may be located in a third arm of a Michelson-style interferometer which also incorporates the unbalanced interferometer. This provides for multiple optical paths through the apparatus of the invention, neglecting any arising from multiple fibre eigenmodes, into which variation in optical path length can be introduced either via the means for introducing a variation in optical path difference or by changing the strain or temperature of the reference or sensor environments. This enables selection of interferograms containing information relating to different causes of optical path difference.

An output broadband interferogram from the Michelson-style interferometer is preferably detected by a first detector and communicated to signal processing means. This allows information to be extracted from interferograms by accurate signal processing techniques.

Both the sensor and reference fibres may have respective partially reflecting ends for light input and at opposing ends respective retroreflecting mirrors. This provides for realising light division into components which traverse different optical paths within the system. Variation in optical path length can be introduced either via the means for introducing a variation in optical path difference or by changing the strain or temperature of the reference or sensor environments and this optical path arrangement provides a capability for isolating the causes of optical path difference in individual interferograms and thus simplifies information extraction.

The sensor and reference fibres may each support two polarisation eigenmodes of propagating radiation, termed the fast and slow eigenmodes. The expression "fast" and "slow" are references to the fact that the different eigenmodes experience different refractive indices and thus propagate at different speeds. Interferograms are referred to as fast-fast, slow-slow, fast-slow and slow-fast to indicate the eigenmodes which produced them. In a preferred embodiment a polarisation controller is located between the sensor element and the reference element and arranged to discriminate against the information of any interferogram by light coupled into the fast eigenmode of one fibre interacting with light coupled into the slow eigenmode of the other fiber. These slow-fast interferograms could be retained and used to extract optical group delay information but the calculations are more complex because an optical path difference will exist for each interferogram regardless of the accuracy with which the physical fibre lengths can be made equal. Furthermore the dispersion exhibited by these interferograms is higher than that shown by fast-fast and slow-slow interferograms. For the purposes of this invention Differential Group Delay ($\tau_{DGD}$), i.e. the difference between the group delays of two interferograms, is a convenient parameter to use in the measurement of strain and temperature. The use of interferograms formed by like-mode interactions (i.e. fast-fast or slow-slow) avoids any dependence of $\tau_{DGD}$ on temperature changes which are common to both sensor and reference fibres. With unlike-mode interferograms $\tau_{DGD}$ would exhibit a strong dependence on such common-mode temperature changes. Thus interferograms formed by like-mode interactions are preferred because of the advantage of simplifying the information extraction by eliminating any beat length imbalance, avoiding the dependence of $\tau_{DGD}$ on common temperature changes and by reducing the need for any dispersion compensation.

In a further embodiment of the invention, the system is also arranged to form a broadband interferogram ($OPD_0$ interferogram) whose path difference is controlled by the means for introducing a variation in optical path difference and is dependent of the environments surrounding the sensor and reference elements. This interferogram is detected at a first detector. The group delay associated with the $OPD_0$ interferogram is thus capable of acting as an absolute reference position which can be defined to have zero group delay, from which the group delays of interferograms affected by the sensor element environment can be measured. This ensures that group delays extracted by the system are referred to an absolute optical path difference of zero. If the means for introducing a variation in optical path difference had a well-defined zero point then this refinement would be unnecessary. However, for practical purposes, it is envisaged that an $OPD_0$ interferogram will be used.

More specifically, the means for introducing a variation in optical path difference may be a translatable mirror. The $OPD_0$ interferogram may thus be formed from one component reflecting from the translatable mirror and a second component reflecting from a partially reflecting end of the reference fibre, the two components having zero path difference when the translatable mirror is located in a central region of its translation range. Alternatively, the means for introducing a variation in optical path difference may comprise an elongatable optical fibre. This provides for the optical path difference to be varied by stretching or compressing the elongatable fibre. The sensor system of the invention is thus capable of being realised in the form of an all-fibre interferometer. In either case, the interferometer may then be arranged to use the $OPD_0$ broadband interferogram to provide a reference group delay with respect to which group delays of further broadband interferograms are measured. This provides an uncomplicated means for realising the formation of an $OPD_0$ interferogram which is independent of variations in the sensor environment.

In a preferred embodiment of the invention, the means for introducing a variation in optical path difference is calibrated with respect to the variation in optical path difference it provides. This is advantageous to increasing the accuracy of group delay measurements as the relevant interferogram is scanned by varying the optical path difference. This calibration may be achieved by active control of the scan speed or by use of a substantially monochromatic light source arranged such that narrowband radiation is coupled into the unbalanced Michelson interferometer to form a fringe interference pattern which is detected by a second detector and analysed by signal processing means. This fringe pattern is capable of providing a calibration scale against which the variation in optical path difference is calibrated with respect to a physical variation of the means for introducing a variation in optical path difference.

Varying the optical path difference effectively scans the relevant interferogram profile across the appropriate detector. The group delay of each interferogram may then be extracted from the Fourier Transform of this profile. The phase variation across each interferogram is preferably extracted by Dispersive Fourier Transform Spectroscopy (DFTS). Curve fitting may then be used to calculate group delay, the first order derivative of this phase variation. This assists the accurate measurement of group delay. Some prior art techniques rely on location of the central fringe of the interferogram. However, noise can significantly reduce the visibility of this peak to the detriment of resolution accuracy; dispersion may alter interferogram shape and complicate the process of centroid location and signal quality can be impaired by a number of external factors. Dispersive Fourier Transform Spectroscopy uses the entire interferogram profile to provide a more accurate tool for determination of group delay.

The system may be arranged to form fast-fast and slow-slow interferograms while the sensor element is subject to a plurality of predetermined conditions of strain and temperature and thereby provide data from which to derive a transformation relating mean and differential group delays of the aforesaid interferograms to applied conditions of strain and temperature. This provides an empirical means with which to equip the system with the capability of relating group delay measurements to particular values of temperature and strain present in the sensor environment. It is advantageous in regard to the simplicity and accuracy provided over theoretical models. Using this empirical data, the system may then be arranged to apply the transformation relating mean and differential group delays to applied conditions of strain and temperature to determination of unknown conditions of strain and temperature by measurement of mean and differential group delays.

In a preferred embodiment the signal processing means may be arranged to (1) extract the group delay of each broadband interferogram from the signals received by the detector;

(2) apply calibration and zero optical path difference corrections in order to calculate mean group delay and differential group delay of the broadband interferograms arising from optical path differences between ray paths through the reference and sensor elements;

(3) derive a relationship between mean and differential group delays experimentally obtained from the sensor system and predetermined conditions of temperature and strain;

(4) apply the derived relationship to experimentally obtained mean and differential group delays and thereby render the sensor system capable of simultaneous measurement of strain and temperature in unknown environmental conditions.

This embodiment provides a means for realising the determination of strain and temperature in the sensor environment from interferometric data received at the Michelson detectors using signal processing means. This provides the advantages of speed and accuracy generally to be had with signal processing power.

The sensor element is preferably mounted in a structure for measurement of strain and temperature within the structure, which promises a number of useful applications. If the structure concerned is one in which the development of strain can weaken the structure but not affect performance until a catastrophic collapse then constant monitoring of internal strain enables the timing of installing a replacement part to be finely tuned to economic and safety criteria.

The use of Michelson-style interferometer lends itself to construction of an embodiment in which the sensor element and reference element are detachable from each other and capable of attachment to other sensor elements or reference elements. This embodiment facilitates portability. A small sensor element can be permanently embedded in a panel without noticeably affecting the panel's performance. The reference section and attendant communicating wires and signal processing means can then be attached to a number of embedded sensor elements sequentially, thereby enabling monitoring of the strain within many structural elements using only one reference section.

The sensor element may be subdivided into sub-elements by a series of partially reflecting mirrors along its length. The second optical path then comprises a series of optical paths each corresponding to reflection at a different partially reflecting mirror. This embodiment also requires that the means for introducing a variation in optical path difference is arranged to provide for formation of a series of interferograms each corresponding to a difference between the first optical path and a respective optical path of said series such that temperature and strain information derived therefrom corresponds to environmental conditions at each sensor sub-element.

In a further aspect the present invention provides a method of simultaneous measurement of strain and temperature comprising the steps of:

(a) arranging for a dual-eigenmode optical sensor element incorporating a high birefringence optical fibre situated in one arm of a Michelson-style interferometer to be in an environment of unknown strain and temperature;

(b) forming at least two broadband interferograms between light travelling a first optical path incorporating the dual-eigenmode sensor element and light travelling a second optical path incorporating a dual-eigenmode reference element, one of the optical paths being variable relative to the other;

(c) determining the variation of optical path difference within each broadband interferogram;

(d) extracting values of group delay from the broadband interferograms formed in Step (b) relative to a predetermined reference group delay;

(e) calculating mean group delay and differential group delay from the extracted values of group delay;

(f) deriving deconvolved values for the unknown strain and temperature conditions of the environment of the sensor element by applying a predetermined transformation to the mean group delay and differential group delay.

The method of the invention exploits the fact that a powerful discrimination between temperature and strain is provided by the effects of such environmental influences on the two polarisation eigenmodes supported by a birefringent optical fibre. There is therefore a great advantage conferred by this method of using the different effects to simultaneously and accurately measure temperature and strain in the environment of a sensor element.

In a further aspect, the predetermined transformation may be determined by:

(a) arranging for the dual-eigenmode optical sensor element to be located in an environment of predetermined strain and temperature;

(b) following Steps (b) to (e) listed above;

(c) deriving a relationship between the predetermined values of strain and temperature of the environment of the sensor element and the values of mean group delay and differential group delay obtained experimentally in Step (b) and thereby deriving the predetermined transformation of Step (h) of the previous aspect.

This aspect provides the advantage that calibration and measurement steps can be carried out using the same apparatus and techniques.

The predetermined reference group delay is preferably determined by forming a further broadband interferogram having a characteristic optical path difference which is independent of the environments of the sensor and reference elements and dependent on variations in the optical path. This provides an accurate method with which to establish a zero reference for the physical variation in the optical path.

The variation of optical path difference within each broadband interferogram may be determined by:

(a) forming a narrowband interferogram having a characteristic optical path difference which is dependent on the variable optical path;

(b) calibrating the variable optical path with respect to the narrowband interferogram in order to determine variation in characteristic optical path difference of broadband interferograms.

This provides a convenient and accurate way with which to calibrate the variation in optical path difference if the physical scan is not accurately linear.

In order that the invention might be more fully understood, an embodiment thereof will now be described with reference to the accompanying drawings in which.

Figure 8A:
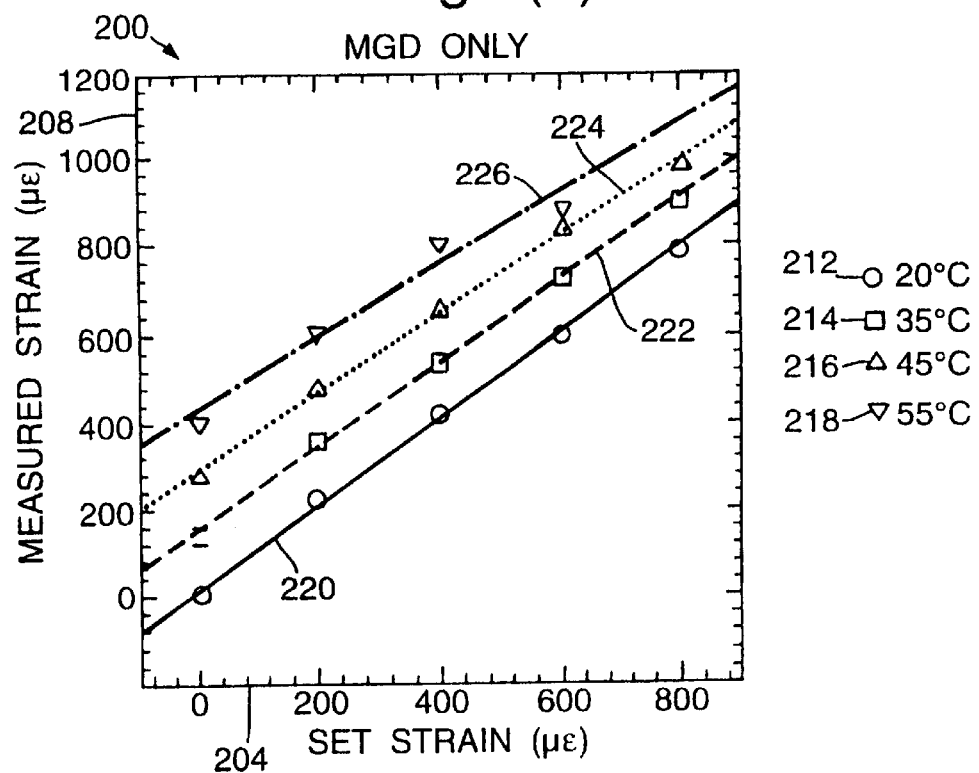
Figure 8B:
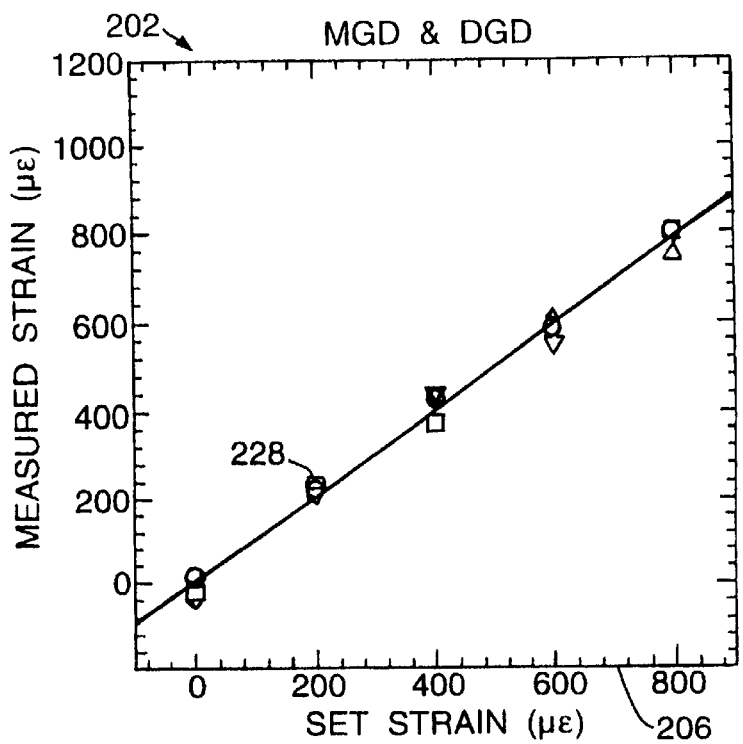

FIGS. 8(a) and 8(b) illustrate graphically applied and measured strain and temperature conditions present in a system.

Figure 1:
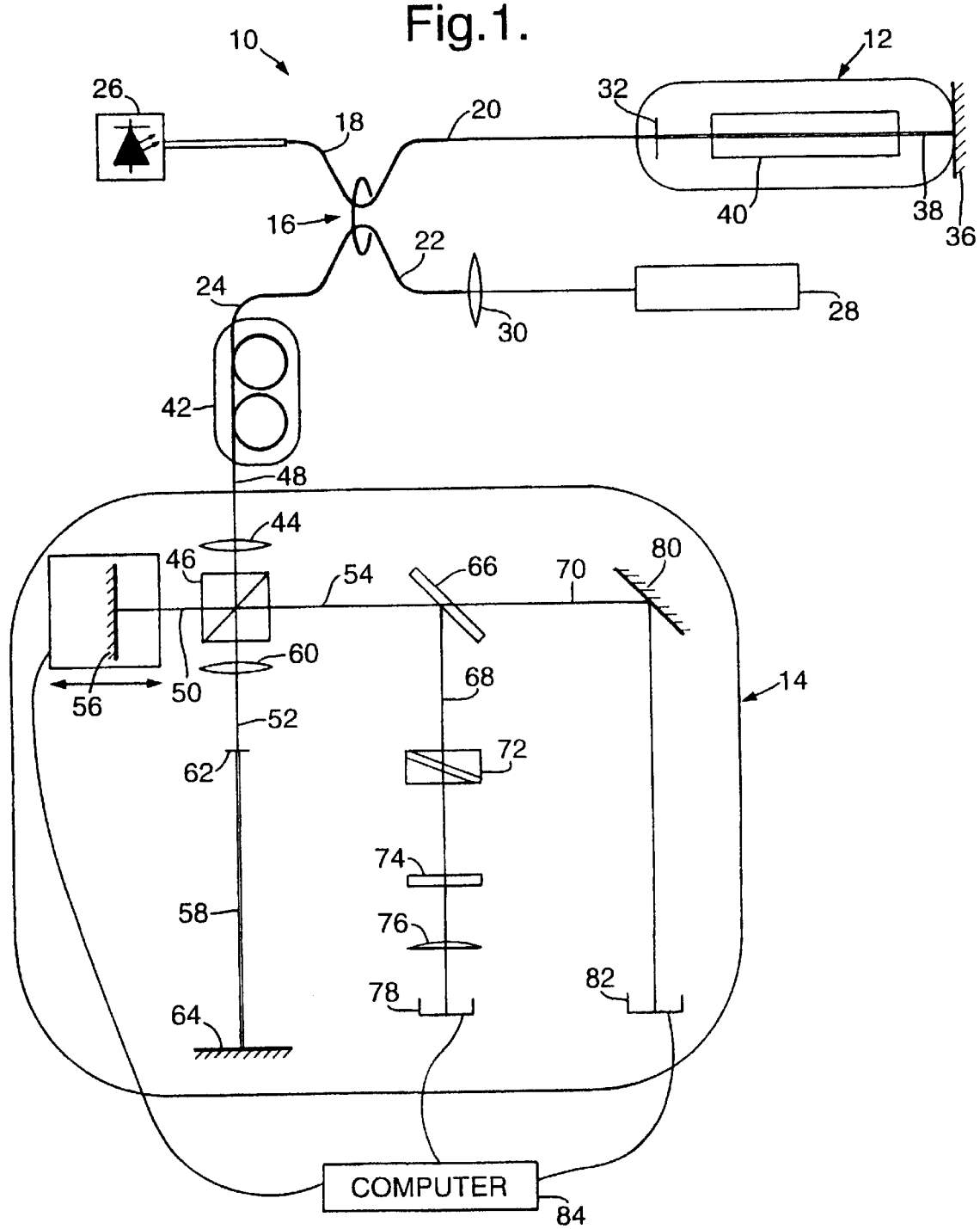
FIG. 1 is a schematic illustration of the sensor scheme of the invention.

With reference to FIG. 1 a sensor system of the invention for simultaneous measurement of strain and temperature is indicated generally by 10. The sensor system 10 incorporates sensing element 12 and an unbalanced scanning Michelson interferometer 14. A four-way directional coupler 16 comprises first, second, third and fourth fibre arms 18, 20, 22 and 24 arranged such that light input along either first arm 18 or fourth arm 24 is output to second arm 20 and third arm 22 and vice versa. The fibre arms 18, 20, 22 and 24 are circular cored. A broadband light source (1.3 $\mu$m light emitting diode, $\Delta\lambda$=80 nm FWHM) 26 is spliced to the first arm 18. Light from a monochromatic source (e.g. a helium neon laser) 28 is coupled via a first lens 30 into the third arm 22. The second arm 20 is connected to a partially reflective spliced end 32 of the sensing element 12. At the other end of the sensing element 12 is a first mirror 36. The sensing element 12 itself comprises a length of highly birefringent (HiBi) optical fibre 38, a 0.3 m section of which is enclosed within a carbon fibre composite panel 40 which can be heated and strained. The fourth arm 24 of the directional coupler 16 contains a polarisation controller 42 the output of which is connected to the Michelson interferometer 14 and thereby constitutes an input to it.

The Michelson interferometer 14 comprises a second lens 44 which collimates light exiting fourth fibre arm 24 into a cube beamsplitter 46. The cube beamsplitter 46 has symmetrically arranged first, second, third and fourth exit/entry directions 48, 50, 52, 54. First direction 48 is an entry decision for light from the fourth fibre arm 24. Second direction 50 corresponds to the shorter arm of the interferometer 14. This arm 50 is traversed by light reflected from the beamsplitter and leads to a second mirror 56 which is translatable in a direction parallel to the direction 50. Light transmitted by the beamsplitter 46 traverses third direction (or longer arm) 52, this arm including a highly birefringent reference fibre 58 and a third (coupling) lens 60. The reference fibre 58 is partially reflecting at the end 62 which is nearest to the cube beamsplitter 46 and is connected to a third mirror 64 at the opposite end. Fourth direction 54 leads from the cube beamsplitter 46 to a dichroic mirror 66 which is arranged to reflect infrared light in the region of wavelength 1.3 $\mu$m along direction 68 and transmit light at HeNe wavelength, namely 632.8 nm, along direction 70. Following direction 68, infrared light is then incident on a polariser 72 passes through an interference filter 74 and is focused by a fourth lens 76 onto a suitable detector 78. An InGaAs detector is used to detect light around 1.3 $\mu$m. Light traversing direction 70 is reflected from a fourth mirror 80 to a detector 82 sensitive to light of wavelength 632.8 nm. A computer 84 receives data from both detectors 78, 82 and also controls the mirror 56 scan.

The highly birefringent sensor and reference fibres 38, 58 are polyimide-coated York HB1250.

Figure 2:
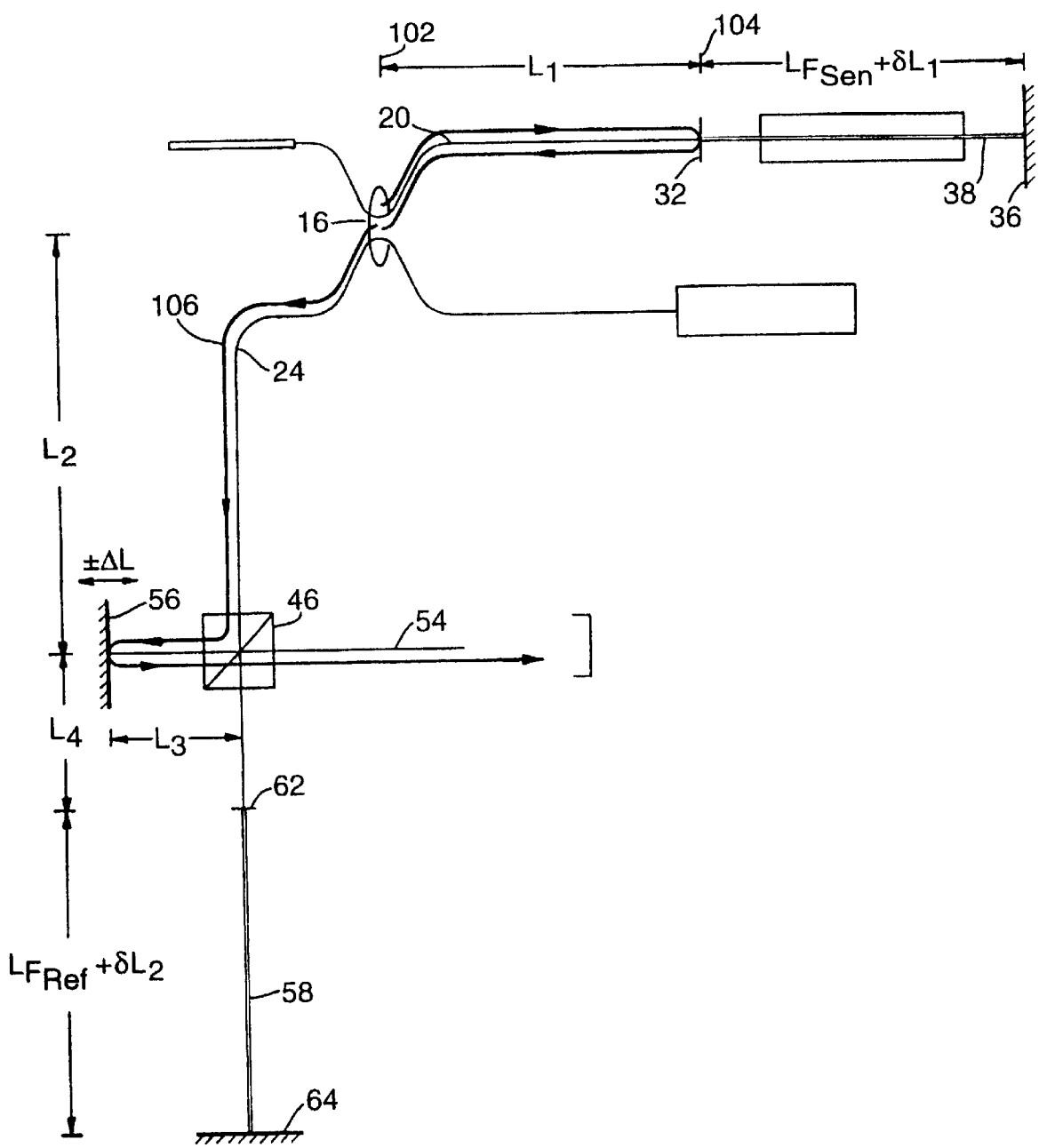
FIGS. 2 to 6 illustrate schematically various alternative optical paths through the apparatus of FIG. 1.

FIG. 2 illustrates schematically a first possible optical path through the apparatus of FIG. 1 for light emitted from the broadband source 26. Components of the system common to both FIG. 1 and FIG. 2 are like referenced. The optical path length of a section of apparatus between the directional coupler 16 and partially reflective spliced end 32 of the sensing HiBi fibre 38 is represented by the symbol $L_1$ between marks 102 and 104. Optical path lengths are indicated in FIG. 2 in a form in which the relevant refractive index is implicitly included in the symbol used. Each symbol referring to a HiBi fibre thus indicates two coincident optical path lengths—one for each propagation mode of that fibre. Furthermore lengths shown are assumed to include all bending of the actual path sections although, for clarity, lengths have been indicated using straight lines extending between marks adjacent to the elements of apparatus of interest. Thus mark 102 is a representation of the position of the directional coupler 16 and mark 104 is a representation of the position of the partially reflective spliced end 32 of the HiBi fibre 38. This consideration extends to all such marks used in the diagram. The optical path length (OPL) between the spliced end 32 and the first mirror 36 for light propagating through the sensing HiBi fibre 38 is indicated by $L_{FSen}+\delta L_1$, where $L_{FSen}$ represents the OPL through the fibre in the absence of any external applied stress and at a conveniently chosen reference temperature and $\delta L_1$ represents the effect of strain and temperature within the fibre 38 on OPL. The OPL between the directional coupler 16 and the centre of the cube beamsplitter 46 is indicated by $L_2$. The OPL between the centre of the cube beamsplitter 46 and the reflective surface of the translated mirror 56 when at its central position is indicated by $L_3$. Further to this the translation of the mirror changes the OPL by an amount given by $\pm\Delta L$. Thus at any given time the OPL in this arm of the interferometer 14 can be taken as $L_3\pm\Delta L$, where $L_3$ is fixed and $\Delta L$ variable. The OPL between the centre of the cube beamsplitter 46 and the end 62 of the reference fibre 58 is indicated by $L_4$. The OPL between the end 62 and the third mirror 64 for light propagating through the reference HiBi fibre 58 is indicated by $L_{FRef}+\delta L_2$ where $L_{FRef}$ represents the OPL through the fibre in the absence of any applied stress and at a convenient reference temperature and $\delta L_2$ represents the effect of strain and temperature with the fibre 58 on OPL. The path through the system shown in this Figure is indicated by the ray line 106.

Figure 3:
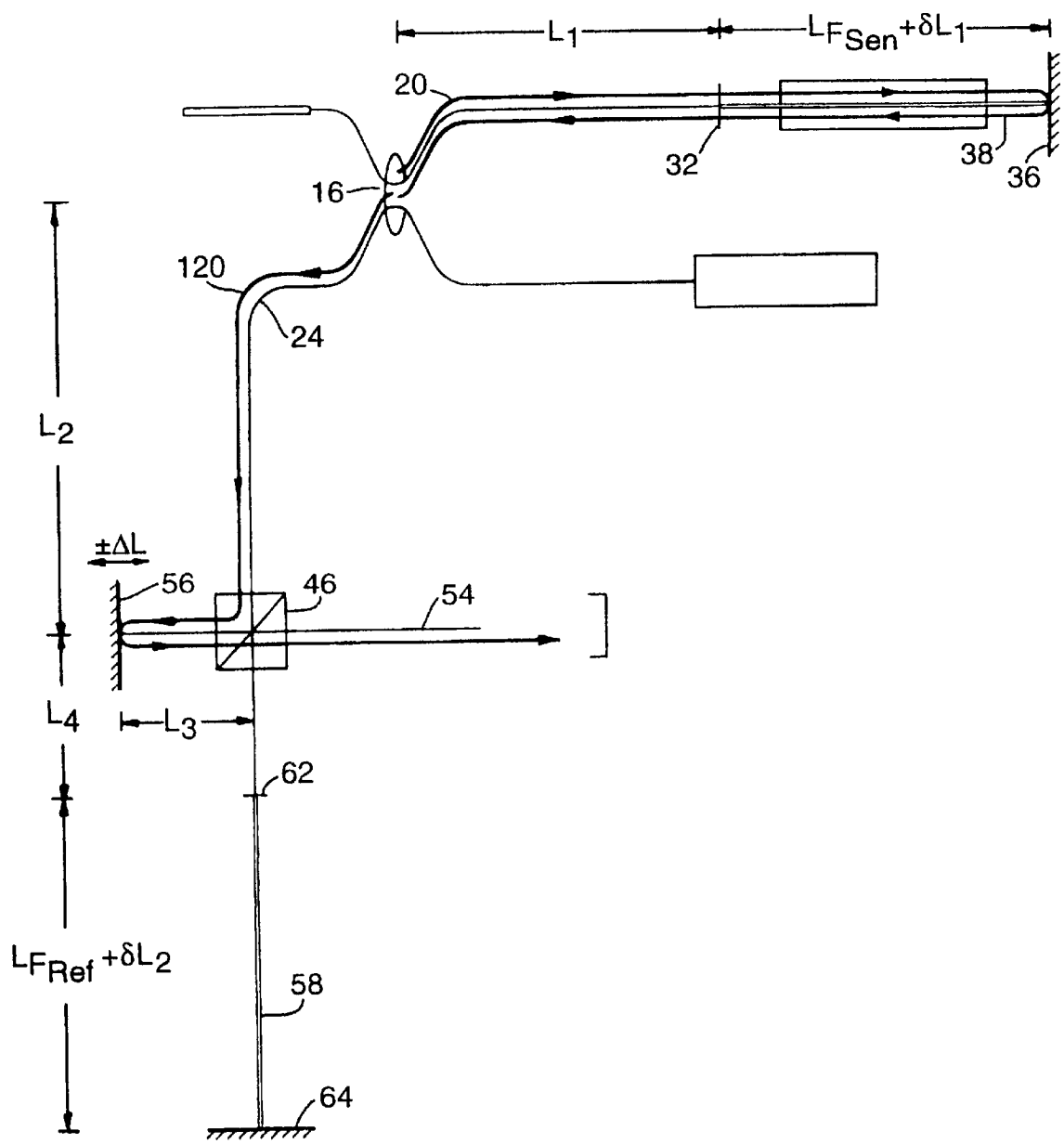

FIGS. 3 to 6 illustrate schematically second, third, fourth and fifth alternative optical paths through the apparatus of FIG. 1 for light emitted by the broadband source 26. Components of the system common to these drawings and to FIGS. 1 to 2 are like referenced. The second path through the system, illustrated in FIG. 3, is indicated by ray line 120. The third, fourth and fifth paths through the system, illustrated in FIGS. 4, 5 and 6 respectively, are similarly indicated by ray lines 140, 160 and 180.

Referring once more to FIG. 1, the mode of operation of the sensor system 10 is as follows. Light from the broadband source 26 enters the system via the first arm 18 of the directional coupler 16. It is partially coupled into the second arm 20 and is partially reflected at the end of this arm at the spliced end 32 of the highly birefringent fibre 38. The reflected component of light will then propagate back through the arm 20 and, on reaching the directional coupler 16 will be partially output through the fourth arm 24. The transmitted component of light reaching the spliced end 32 propagates along the HiBi fibre 38, is reflected by the mirror 36 and returns via the spliced end 32 along the second arm 20.

The HiBi fibre 38 encased in a carbon fibre composite panel 40 comprises the sensing element 12. When the composite panel 40 is heated and stressed such effects are passed on to the HiBi fibre 38. Internally, the structure of the fibre 38 is thus strained and heated giving rise to a change in optical properties. In particular the optical path length is affected by a combination of both a physical length adjustment and a change in refractive index. The high birefringence of a HiBi fibre is imparted by thermally induced stresses. Temperature changes modify these induced stresses, changing the birefringence. Thus strain and temperature modify the propagation constants of the two eigenmodes of stress-induced HiBi fibre. The change in propagation constants is not the same for each eigenmode.

A general applied stress will have longitudinal and transverse components. The transverse stress is very unlikely to be constant along the length of the fibre. This will lead to fluctuations in the birefringence at different positions in the light path which distort the final image. A highly birefringent fibre however effectively shields the birefringence against transverse stresses. This is particularly important in that the process of embedding the fibre in a composite panel will induce a significant amount of transverse stress in the fibre which will itself have an unknown effect on both the birefringence and polarisation of propagating light.

The longitudinal stress component measured using this apparats is an integrated average along the fibre length and not distortive of the interferogram image.

Strain will also affect the polarisation state of any light propagating within the fibre. This serves only to distort the input signal and reduce the visibility of any subsequently formed interferogram. A HiBi fibre also constrains light propagation to one or both polarisation eigenmodes of the fibre system. The high birefringence of the fibre 38 means that the eigenmodes are effectively locked into their original polarisations regardless of all but the highest stresses subsequently exerted on the sensing element 12.

Thus the high birefringence of the fiber 38 defines and maintains the polarisation states of the eigenmodes of the system. The two eigenmodes are labelled "fast" and "slow" with reference to their relative propagation velocities along the fibre 38. The two orthogonal polarisation eigenmodes are such that the fast eigenmode experiences a smaller refractive index than the slow eigenmode. The birefringence of the fibre 38 thus provides for two different optical path lengths to be traversed during a single pass of this section of the apparatus. These are defined by the refraction index pertinent to the fast eigenmode of the fibre 38 and that pertinent to the slow eigenmode.

After passing through the second arm 20 all guided light (regardless of whether or not it propagated along the HiBi fibre 38) returns to the directional coupler 16 and is output along the fourth fibre arm 24. This arm incorporates a polarisation controller 42 which enables the polarisation state of the light to be adjusted in order to ensure that interferograms are obtained between the fast eigenmode of the sensor fibre 38 and the fast eigenmode of the reference fiber 58 and similarly between both slow eigenmodes by reasons which will be explained later. Light exiting the polarisation controller 42 is input to the unbalanced Michelson interferometer 14. The second lens 44 collimates light from the fibre arm 24 towards the cube beamsplitter 46. The cube beamsplitter 46 facilitates amplitude division of light: one component traverses the shorter arm 50 and the other is input to the longer arm 52. The mirrors 56 and 64 are situated at the end of each arm in order to retroreflect light in the shorter 50 and longer 52 arms respectively for return to the cube beamsplitter 46. Mirror 56 is translatable in a direction parallel to light propagation in arm 50. At the mid-position of its translation range the reflective surface of the mirror 56 is situated an optical path length of $L_3$ away from the centre of the cube beamsplitter 46. The third lens 60 in the longer arm 52 of the interferometer 14 couples collimated light transmitted by the beamsplitter 46 into the second highly birefringent fibre, the reference HiBi fibre 58. A component of the light in this arm 52 is reflected by the partly reflected end 62 of the HiBi fibre 58 and returns along a section of the arm 52 to the cube beamsplitter 46. That component of light which is transmitted by the end 62 traverses the length of the reference HiBi fibre 58, is reflected by mirror 64 and returns along the reference fibre 58 to be collimated by the third lens 60 back to the cube beamsplitter 46. The reference HiBi fibre 58, like the sensor HiBi fibre 38, allows propagation in two eigenmodes (also fast and slow) which are polarisation locked.

After traversing one of the two arms 50, 52 of the unbalanced interferometer 14, light is returned to the cube beamsplitter 46 and output along direction 54. Thereafter, light from the broadband source 26 follows the same path. From the beamsplitter 46 light propagates to the dichroic mirror 66 which reflects light of wavelength in the region of 1.3 μm along path 68 towards the infrared detector (InGaAs) 78. The dichroic mirror 66 is transparent to light wavelength 632.8 nm, and so light from this source passes to the second detector 82 which is sensitive to light of this wavelength. The fourth lens 76 focuses the light travelling different paths within the system onto the detector 78 where broadband interferograms are formed. The polariser 72 can be adjusted to give interferograms of the best visibility and the interference filter 74 shields the detector from HeNe light and stray light (with wavelength outside its passband) which may have reached this section of the interferometer 14.

There are thus six distinct paths, neglecting any scattering losses at beamsplitters and power losses at the directional coupler, which can be followed by light entering the apparatus from the broadband light source 26. Five of these are illustrated in FIG. 2 to 6. Visible interference fringes will only result from a broadband source if the optical path difference is near zero. Thus the longest possible path through the apparatus, through both the sensor 38 and reference 58 fibres, has not been illustrated as it cannot interfere with any other beam to produce interference fringes. In FIGS. 2 to 6, path lengths in the sections of apparatus between the source 26 and the directional coupler 16 and between the cube beamsplitter 46 and the detector 78 have been neglected as common to all paths and therefore not contributing to any path difference between the various routes.

In FIG. 2, a sketch is shown of all of the path taken by a first component of the broadband light entering the system. The path followed is indicated by ray 106. Light leaves the directional coupler 16 and follows fibre arm 20 at the end of which a component is reflected by the partially reflective spliced end 32 of the HiBi sensor fibre 38. This component then returns back along the arm 20 to the directional coupler 16. In this section the optical path length (OPL) is $2L_1$. From the directional coupler 16, this component of light propagates along fibre arm 24 to the centre of the cube beamsplitters 46, an OPL of $L_2$. This component is then reflected at the cube beamsplitter 46 and propagates a distance $L_3 \pm \Delta L$, if the mirror 56 is a distance $\Delta L$ from the midpoint of its translation range, to the mirror 56. Again the light is reflected back on itself to the cube beamsplitter 46, thereby covering a total OPL in this section of $2(L_3 \pm \Delta L)$. The "+" denotes that the mirror 56 translation is away from the cube beamsplitter 46 and the "−" denotes translation towards the beamsplitter 46. If the total OPL covered by this component between directional coupler 16 and exit from the cube beamsplitter 46 along direction 54 is denoted by OPL1, then $$OPL1 = 2L_1 + L_2 + 2(L_3 \pm \Delta L) \qquad (1)$$

In FIG. 3, a sketch is shown of the path taken by a second component of the broadband light entering the system. The path followed is indicated by ray 120. Light leaves the directional coupler 16 and follows fibre arm 20, passes through the partially reflective spliced end 32 into the HiBi sensor fibre 38. At the far end of the fibre 38 it is reflected by mirror 36 back along the HiBi fibre 38 and fibre arm 20 and returns to the directional coupler 16. In the fibre arm 20 section the OPL is $2L_1$. In the HiBi sensor fibre 38 section the OPL is $2(L_{FSen} + \delta L_1)$ where $L_{FSen}$ represents the OPL through the fibre in the absence of any externally applied stress and at the reference temperature and $\delta L_1$ represents the effect on OPL of stress and temperature changes applied during the experiment. After its return to the directional coupler 16, this component of light propagates along fibre arm 24 to the centre of the cube beamsplitter 46, an OPL of $L_2$. The component is then reflected at the cube beamsplitter 46 and propagates to the mirror 56 situated a distance $\Delta L$ from the midpoint of its translation range. After reflection at mirror 56 and return to the cube beamsplitter 46 the total OPL of this section is $2(L_3 \pm \Delta L)$. If the total OPL covered by this component between directional coupler 16 and exit from the cube beamsplitter 46 along direction 54 is denoted by OPL2, then $$OPL2 = 2L_1 + 2(L_{FSen} + \delta L_1) + L_2 + 2(L_3 \pm \Delta L) \qquad (2)$$

Figure 4:
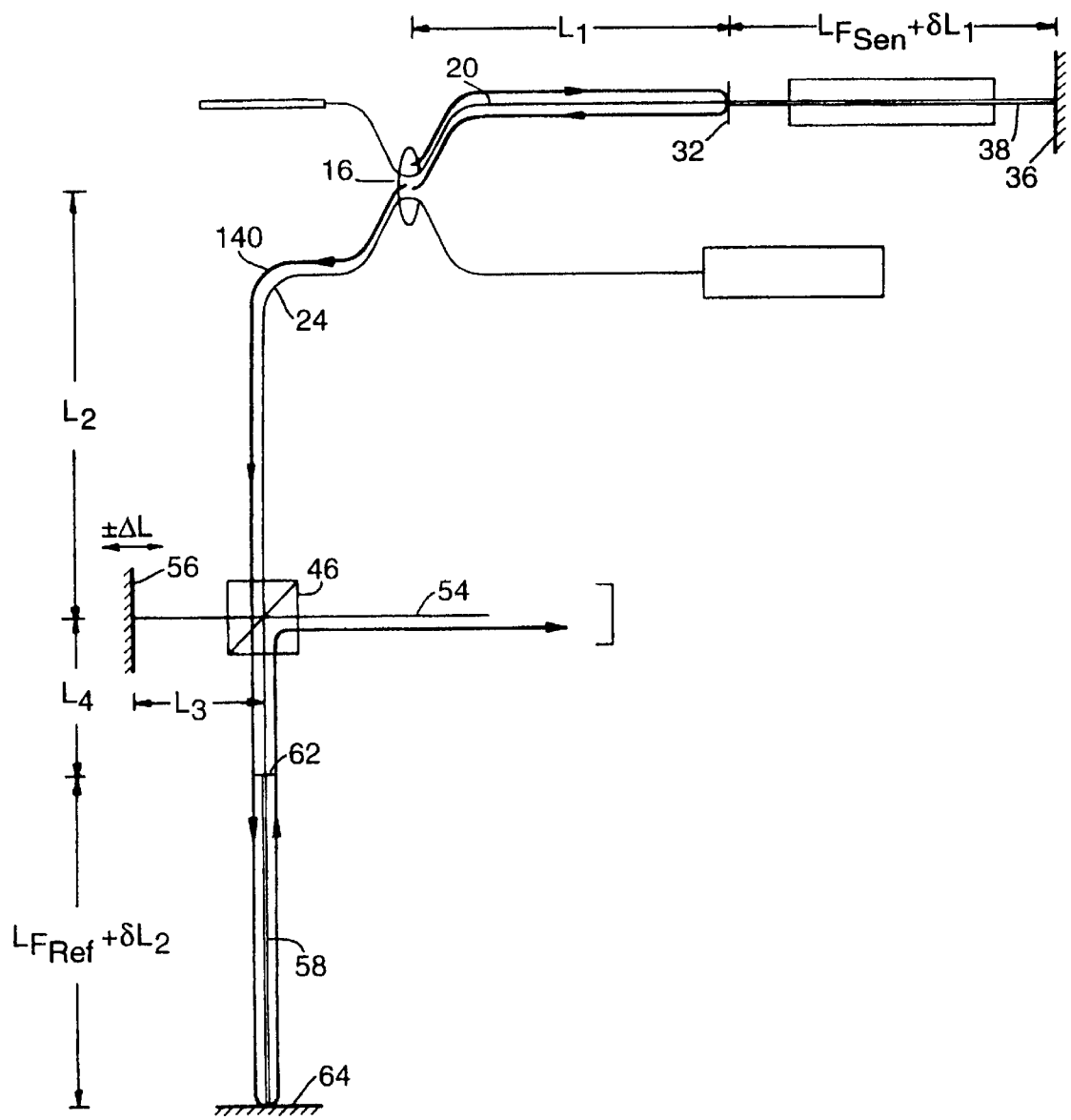

In FIG. 4, a sketch is shown of the path taken by a third component of the broadband light entering the system. The path followed is indicated by ray 140. Light leaves the directional coupler 16 and follows fiber arm 20, is reflected from the partially reflective spliced end 32 and returns to the direction coupler 16. In this fibre arm section the OPL is $2L_1$. From the directional coupler 16, this component of light propagates along fibre arm 24 to the centre of the cube beamsplitter 46, an OPL of $L_2$. This component is then transmitted by the cube beamsplitter 46 and propagates a distance $L_4$ to the partially reflective end 62 of the reference HiBi fibre 58. On transmission through this end, the component 140 propagates along the reference HiBi fibre 58, is reflected at mirror 64 and returns to the cube beamsplitter 46. The total OPL in the region between the cube beamsplitter 46 and the reflective end 62 is thus $2L_4$. The total OPL through the reference HiBi fibre 58 is given by $2(L_{FRef} + \delta L_2)$ where $L_{FRef}$ represents the optical path length of the fibre 58 in an unstrained state at the reference temperature and $\delta L_2$ represents the change in optical path length if a stress or temperature change is applied. If the total OPL covered by this component between directional coupler 16 and exit from the cube beamsplitter 46 along direction 54 is denoted by OPL3, then $$OPL3 = 2L_1 + L_2 + 2(L_4 + L_{FRef} + \delta L_2) \qquad (3)$$

Figure 5:
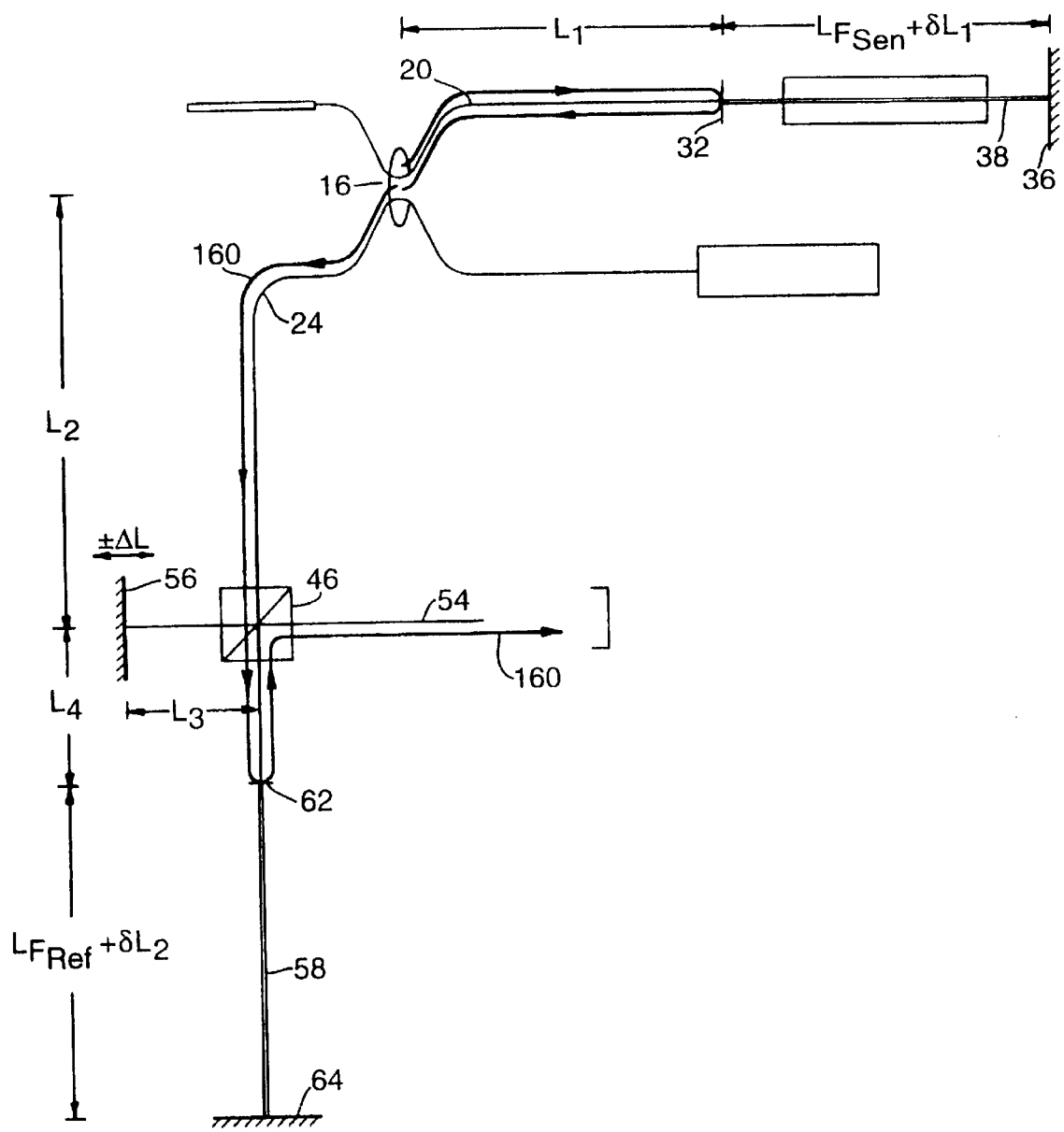

In FIG. 5, a sketch is shown of the path taken by a fourth component of the broadband light entering the system. The path followed is indicated by ray 160. Light leaves the directional coupler 16, follows fiber arm 20, is reflected from the partially reflective spliced end 32 and returns to the directional coupler 16, a total OPL of $2L_1$. From the directional coupler 16, this component of light 160 propagates an OPL of $L_2$ along fibre arm 24 to the centre of the cube beamsplitter 46. It is then transmitted by the cube beamsplitter 46 and propagates a distance $L_4$ to the partially reflective end 62 of the reference HiBi fibre 58. On reflection at this end, the component 160 is returned to the cube beamsplitter 46. If the total OPL covered by this component between its first pass of the directional coupler 16 and exit from the cube beamsplitter 46 along direction 54 is denoted by OPL4, then $$OPL4 = 2L_1 + L_2 + 2L_4 \qquad (4)$$

Figure 6:
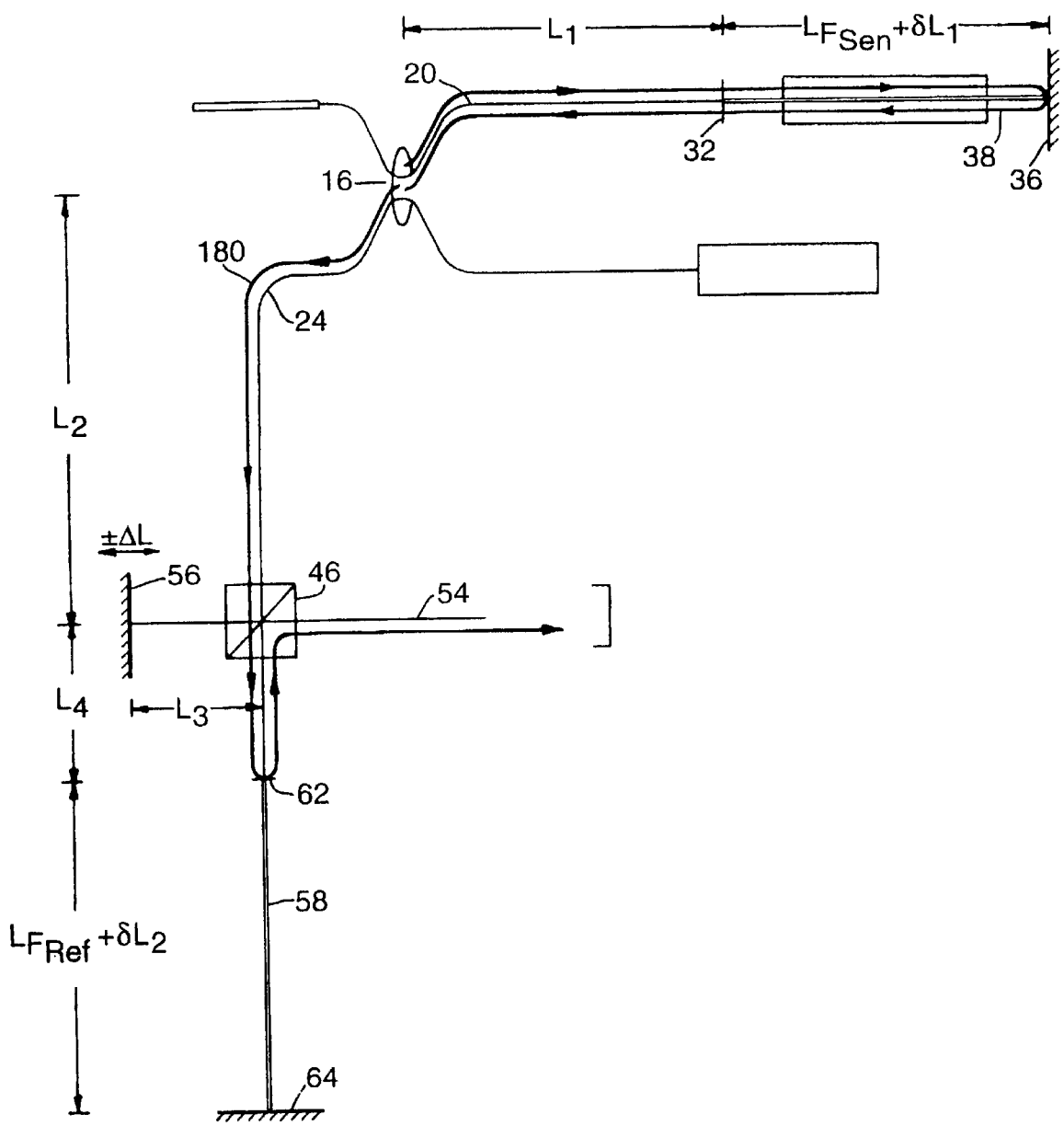

In FIG. 6, a sketch is shown of the path taken by a fifth component of the broadband light entering the system. The path followed is indicated by ray 180. Light leaves the directional coupler 16 following fibre arm 20, passes through the partially reflective spliced end 32 into the HiBi sensor fibre 38. At the far end of the HiBi fibre 38 it is reflected by mirror 36 back along the HiBi fibre 38, the fibre arm 20 and the directional coupler 16. In the fibre arm 20 the OPL is $2L_1$. In the HiBi sensor fibre 38 the OPL is $2(L_{FSen} + \delta L_1)$ as in FIG. 3. From the directional coupler 16, this component of light 180 propagates an OPL of $L_2$ along fibre arm 24 to the centre of the cube beamsplitter 46. It is then transmitted by the cube beamsplitter 46 and propagates a distance $L_4$ to the partially reflective end 62 of the reference HiBi fibre 58. On reflection at this end, the component 180 is returned to the cube beamsplitter 46. If the total OPL covered by this component between directional coupler 16 and exit from the cube beamsplitter 46 along direction 54 is denoted by OPL5, then $$OPL5 = 2L_1 + 2(L_{FSen} + \delta L_1) + L_2 + 2L_4 \tag{5}$$

The two HiBi fibres 38 and 58 are arranged to have the same optical path lengths at the reference temperature in their unstrained states i.e. $L_{FSen} = L_{FRef} = L_F$, to within ~100 μm and the interferometer is arranged so that $L_3 = L_4$. As noted earlier a good interference pattern can only be observed using broadband light if the optical path difference (OPD) is less than the source coherence length. Given that the physically variable quantities and $\Delta L$, $\delta L_1$ and $\delta L_2$, observable interferograms due to the scanning mirror 56 may arise from the following optical path differences only:

$$OPD14 = OPL1 - OPL4 = \pm 2\Delta L \tag{6}$$

$$OPD25 = OPL2 - OPL5 = \pm 2\Delta L \tag{7}$$

$$OPD23 = OPL2 - OPL3 = 2(\delta L_1 - \delta L_2) \pm 2\Delta L \tag{8}$$

Clearly only Equation (8) above includes information as to the strain and temperature experienced within the sensor fibre 38 ($\delta L_1$). Thus it can be seen that the interferogram containing the strain information is formed by interference between light following a path through the sensor fibre 38 and then reflected from the translatable mirror 56 (FIG. 3) and light reflected from the partially reflective spliced end 32 of the sensor fibre 38 which then propagates through the reference fibre 58 which thus balances OPD (FIG. 4). A second benefit is that the effects of dispersion are also balanced and so the visibility of the fringe system is increased. As the mirror 56 is translated, the intensity of light at the detector 78 will change and the variation in optical path difference can be deduced. The interferogram comprises the intensity variation with time as the mirror 56 is scanned.

The purpose of the translatable mirror 56 is to provide a variable path length ($\pm 2\Delta L$) which enables the required interferogram to be selected and scanned. This function may equally be performed by alternative components, for example, an optical fibre of variable length which may be stretched or compressed to provide a longer or shorter path respectively. For the purposes of this invention, the effect of scanning the translatable mirror 56 is thus equivalent to the effect of varying the length of an optical fibre incorporated in the shorter interferometer arm 50.

There are four interferograms which can result from the above two light paths 120 and 140. Light may propagate through both HiBi fibres 38, 58 in either the fast or slow eigenmode. Thus fast-fast, slow-slow, slow-fast and fast-slow interferograms can result from arbitrarily oriented fibres. If the two HiBi fibres are of identical composition and length then the fast-fast and slow-slow interferograms will be superimposed, although perpendicularly polarised. In this embodiment the two central (fast-fast and slow-slow) interferograms only are selected as their lower dispersion simplifies both the experimental and theoretical situations. The optical path difference for fast-slow or slow-fast interferograms includes, as well as any fibre length imbalance, an added component due to differences in the eigenmode propagation constants between the fibres. The far larger OPD also results in a larger shift of these interferograms from the mean group delay point. The selection of fast-fast and slow-slow interferograms is ensured by the polarisation controller 42. Light incident on the partially reflective spliced end 32 of the sensor fibre 38 is polarised at around 45° to the polarisation axes of the birefringent fibre in order to populate the two polarisation eigenmodes to a substantially equal extent. This polarisation state is maintained when light exits from the spliced end 32 to propagate back along the fibre arm 20 regardless of whether the component of light passed through the HiBi fibre or is simply reflected at the spliced end 32. However the circular-cored fibres do not maintain the polarisation state and light will leave the fourth fibre arm 24 with an arbitrary elliptical polarisation unless restoration is effected using the polarisation controller 42. The reference fibre 58 and polarisation controller 42 are mutually arranged such that light polarised parallel to the fast axis of the sensor fibre 38 is coupled into the fast eigenmode of the reference fibre 58, and a similar condition is maintained for the slow eigenmodes.

OPD14 and OPD25 are also used in this invention. These path differences are generated when paths diverge in the unbalanced interferometer 14 only: one path involves rays reflecting from the translatable mirror 56 and the other comprises rays reflecting from the partially reflective end 62 of the reference HiBi fibre 58. The interferogram so formed is fixed in so far as its group delay and dispersion characteristics are unaffected by environmental perturbations of the sensor fibre 38: it is entirely dependent on the position, $\pm \Delta L$, of the translatable mirror 56. It can thus be used to define an $OPD_0$ interferogram which ideally arises when $\Delta L = 0$, although in practice the $OPD_0$ interferogram will serve to define the $\Delta L = 0$ point.

In operation of the FIG. 1 embodiment, the computer 84 is arranged to simultaneously control the scanning mirror 56 and receive interferogram data detected at the detectors 78, 82. It is then further arranged to process information contained within the interferograms and perform the calculations described below. The translatable mirror 56 is scanned and the relative positions of the interferograms which occur are noted. The broadband source 26 has a short coherence length which gives rise to discrete interferograms, the centroid of each being located at a position defined by an OPD of zero between the relevant paths. The $OPD_0$ interferogram defines a fixed point relative to which the group delays of the fast-fast and slow-slow interferograms can be measured. From these measurements the mean group delay ($\tau_{MGD}$) and differential group delay ($\tau_{DGD}$) of the fast-fast and slow-slow eigenmode interferograms can be calculated as follows:

$$\tau_{MGD} = \frac{\tau_{ff} + \tau_{ss}}{2} - \tau_0 \tag{9}$$

$$\tau_{DGD} = \tau_{ff} - \tau_{ss} \tag{10}$$

where $\tau_{MGD}$ and $\tau_{DGD}$ are the mean and differential group delays respectively, $\tau_{ff}$ and $\tau_{ss}$ are the group delays of the fast-fast and slow-slow eigenmode interferograms respectively and $\tau_0$ is the group delay of the $OPD_0$ interferogram.

Strain and temperature are related to $\tau_{MGD}$ and $\tau_{DGD}$ by linear well-conditioned transformations and so simultaneous equations of the form $$\begin{pmatrix} \tau_{MGD} \\ \tau_{DGD} \end{pmatrix} = \begin{bmatrix} M_\varepsilon & M_T \\ D_\varepsilon & D_T \end{bmatrix} \begin{pmatrix} \varepsilon \\ T \end{pmatrix} \quad (11)$$

where $\varepsilon$ is the strain within and T the temperature of the sensor 12 environment and $M_\varepsilon$, $M_T$, $D_\varepsilon$ and $D_T$ are the coefficients of the transformation matrix, can be set up. Experimental observation reveals that strain and temperature affect the mean group delay of the eigenmodes and the differential group delay differently. The inverted transformation is therefore particularly suitable for use as the basis of this technique for simultaneous measurement of strain and temperature.

Accurate measurement of the group delay of each interferogram is essential. Ideally such a measurement would be derived from location of the central fringe of the interferogram. However, in this case the broadband source signal is weak and so a small amount of noise can degrade the central fringe peak rendering it indistinguishable from neighbouring peaks. A second problem is caused by changes in dispersion within a broadband signal altering the shape of the interferogram. Consequently neither the central nor the largest fringe peak will necessarily coincide with the centroid of the interferogram. Thirdly, the process of embedding a fibre within a composite panel will also impair the signal quality. The group delay of the interferogram is thus derived using a more fundamental and robust approach which follows from the mathematics of harmonic analysis. The Fourier transform of the interferogram can be found by taking the Fast Fourier Transform (FFT) of a resampled version of a sampled interferogram. Dispersive Fourier transform spectroscopy (DFTS) uses the FFT to generate a function in frequency space. The argument of this function, $\phi(\omega)$, is related to group delay $\tau$ as follows:

$$\tau = \frac{\partial \phi}{\partial \omega} \quad (12)$$

Thus the group delay is the mean gradient of the phase $\phi(\omega)$ across the source spectrum. It is obtained in this embodiment of the invention by curve fitting.

Referring once again to FIG. 1, a fourth interferogram of interest is generated by light entering the interferometer from the HeNe laser 28. Light from this source is coupled by the directional coupler 16 into the fibre arm 24 and through the polarisation controller 42. From here the light is input to the cube beamsplitter 46 of the unbalanced interferometer 14 via lens 44. At the beamsplitter one component of HeNe light follows the path 50 to be reflected from translatable mirror 56 and then returned to the beamsplitter 46. The second component of HeNe light is partially reflected from the end 62 of the reference fibre 58 and returned to the beamsplitter 46. Here the two components recombine and exit along direction 54, are transmitted by the dichroic mirror 66 along direction 70 and are directed by a fourth mirror 80 to a detector 82 which is sensitive to light at 632.8 nm. The monochromatic light from the HeNe laser 28 has a sufficiently long coherence length that interference fringes are formed regardless of the path length imbalance between $L_3 \pm \Delta L$ and $L_4$. The formation and location of these fringes is used initially to align the bulk optics and later to calibrate the OPD scan of the translatable mirror 56.

The translatable mirror 56 is driven by a DC motor (not shown) in order to facilitate an OPD scan. This results in a smooth scan but with fluctuating velocity and so this method cannot provide a fixed reference position from which to calculate group delay. The OPD cannot then be assumed to be a linear function of time; it must be both calibrated and compensated. The way in which this is achieved is described below.

The OPD is scanned and the HeNe and broadband interferograms are recorded simultaneously by sampling at regular intervals throughout the scan at times $t_i$. By virtue of the probable non-uniform velocity of the OPD scan, the group delay difference corresponding to successive samples may not be constant. A value of group delay must therefore be assigned to each sampled datum. These group delay values are extracted from HeNe interferogram. In processing, the d.c. component is first removed from the interferogram by subtracting its mean value. The remaining a.c. interferogram (l(t)) is assumed to be of the form:

$$I(t) = A(t)\cos[\omega_0 \tau(t)] \quad (13)$$

where A(t) is an unknown amplitude modulation and $\tau(t)$ the group delay. The sampled data are combined with their numerical Hilbert transform to give the sampled analytic signal:

$$I(t) = A(t_i)\exp[i\,\omega_0\,\tau(t_i)] \quad (14)$$

The phase of this signal is extracted and unwrapped, by adding integer multiples of $2\pi$ to remove all discontinuities of absolute value greater than $\pi$. From the unwrapped phase, the group delay $\tau(t_i)$ of each datum measured at time $t_i$ is extracted. Each broadband interferogram thus comprises a number of peaks with a calibrated value of group delay for each point. The software then selects each of the three largest peaks in turn, resamples the interferogram in the vicinity of each peak so as to give points regularly spaced in group delay, then applies DFTS to derive their mean group delay with high resolution.

Thus, as the translatable mirror is scanned, observation of the HeNe interferogram establishes a calibrated scale. To find the position of each broadband interferogram on this calibrated scale the centroid must be found. This is done by using the curve fitting method to solve Equation 12.

It has been stated previously that this technique to measure strain and temperature will work effectively only if strain and temperature can be related to $\tau_{MGD}$ and $\tau_{DGD}$ by linear well-conditioned transformations. This is established by experimental means as follows. Assume the linear relationship of Equation 11:

$$\begin{pmatrix} \tau_{MGD} \\ \tau_{DGD} \end{pmatrix} = \begin{bmatrix} M_\varepsilon & M_T \\ D_\varepsilon & D_T \end{bmatrix} \begin{pmatrix} \varepsilon \\ T \end{pmatrix} \quad (11)$$

where $\tau_{MGD}$ and $\tau_{DGD}$ are the mean and differential group delays respectively, $\varepsilon$ is the strain induced in the sensor fibre and T the temperature of the sensor fibre. The matrix coefficients $M_\varepsilon$, $M_T$, $D_\varepsilon$ and $D_T$ can be derived from a series of measurements of group delays made with various known conditions of temperature and strain. Measurements made over a range of different conditions resulted in the values:

$M_\varepsilon$=2.76 fs/$\mu\varepsilon$  $M_T$=36.9 fs/K $D_\varepsilon$=0.043 fs/$\mu\varepsilon$  $D_T$=−1.43 fs/K To recover strain and temperature from a set of $\tau_{MGD}$ and $\tau_{DGD}$ measurements, the matrix of Equation 11 substituted with the values derived about should be inverted and applied to measurements of $\tau_{MGD}$ and $\tau_{DGD}$. Thus, the recovery matrix is $$\begin{pmatrix} \varepsilon \\ T \end{pmatrix} = \begin{pmatrix} 0.26(fs/\mu\varepsilon)^{-1} & 6.68(fs/\mu\varepsilon)^{-1} \\ 0.0077(fs/K)^{-1} & -0.50(fs/K)^{-1} \end{pmatrix} \begin{pmatrix} \tau_{MGD} \\ \tau_{DGD} \end{pmatrix}$$

The negative temperature-dependent $\tau_{DGD}$ coefficient ensures that the condition number of the matrix is low which is essential to prevent the transformation magnifying measurement errors. Many prior art techniques rely on a near-singular matrix which cannot avoid such error magnification.

Figure 7:
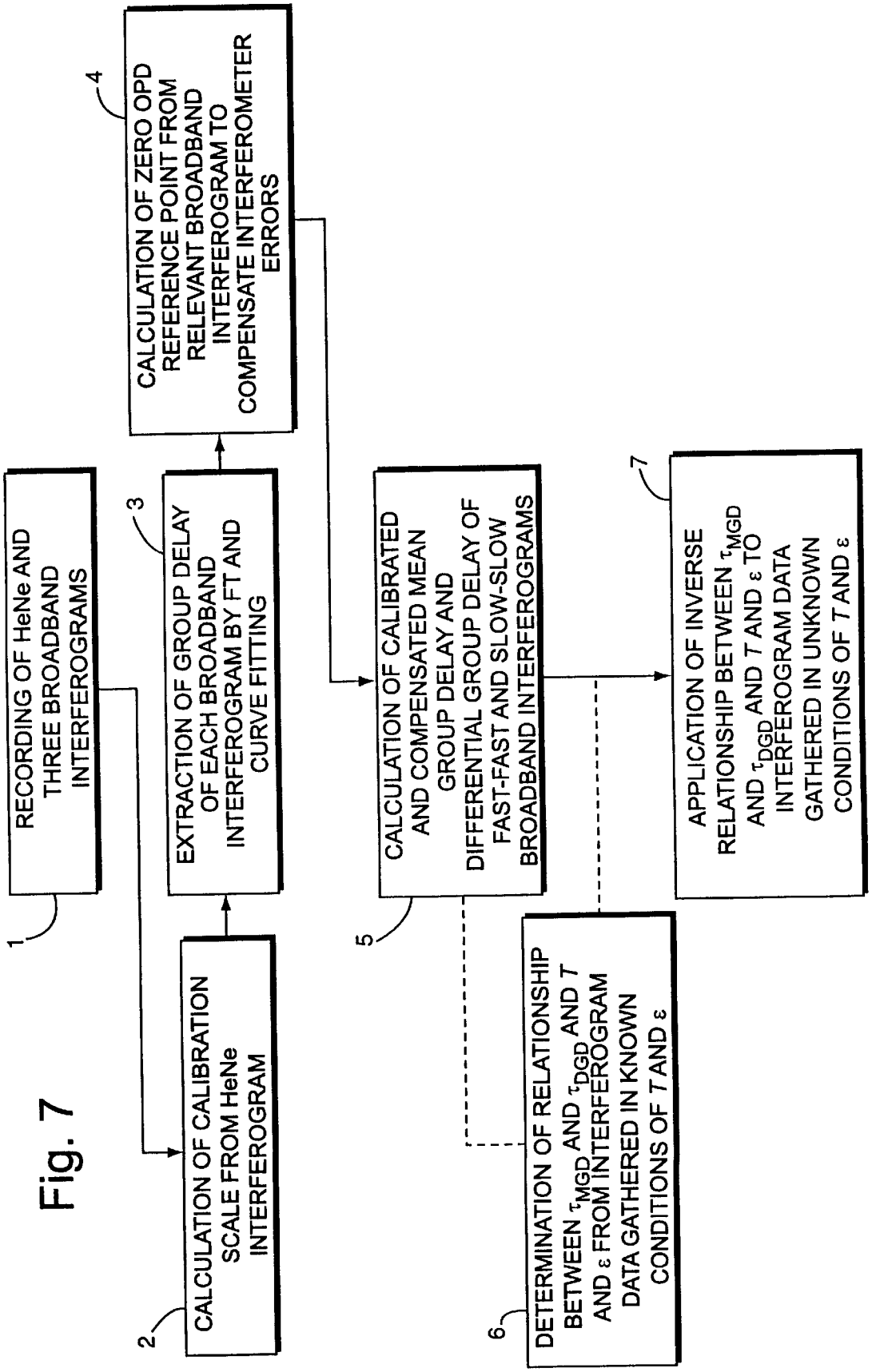
FIG. 7 is a flowchart of the software signal processing steps for determining strain and temperature from the output of the device of FIG. 1.

FIG. 7 summarises the steps involved in processing the interferograms to obtain values for temperature and strain. The computer 84 includes recording means (Box 1), extracting means (Box 3), calculating means (Boxes 2, 4, 5), calibrating means (Box 6) and processing means (Box 7) with which to operate on interferogram data.

Box 1 in FIG. 7 represents the computer 84 recording the broadband fast-fast, slow-slow and $OPD_0$ interferograms from the light intensity reaching the IR detector 78 as the mirror 56 is scanned. Similarly, the HeNe interferogram is recorded from light intensity reaching the optical detector 82 as the mirror 56 is scanned. Box 2 denotes the calibration of the mirror scan to change in OPD using data from the fringe system of the HeNe interferogram. Boxes 3 and 4 denote the operation of computer software to extract values for the group delays of each broadband interferogram and to calculate the $OPD_0$ reference point using the sensor-independent broadband $OPD_0$ interferogram respectively. Box 5 denotes application of the correction factors determined in Boxes 2 and 4 to the group delays extracted in Box 3 and calculation of mean and differential group delays of the fast-fast and slow-slow interferograms from these corrected group delays. Box 6 denotes the determination of the matrix coefficients of Equation 11 from predetermined sensor element 12 values of T and $\varepsilon$ and values of $\tau_{MGD}$ and $\tau_{DGD}$ derived as in Boxes 1 to 5. It is necessary to perform this step only once for each set of T and $\varepsilon$ conditions at the reference arm. The matrix elements so derived are then used repeatedly for the step indicated at Box 7. This Box indicates application of the inverse relationship to that derived at Box 6 to values of $\tau_{MGD}$ and $\tau_{DGD}$ derived as in Boxes 1 to 5 in order to derive values for the strain and temperature conditions experienced by the sensor element 12. Throughout these calculations, T and $\varepsilon$ in the reference arm must be kept constant at their calibration values or independently monitored. It is relatively easy to shield the reference arm and so maintain $\varepsilon$ at zero, however, T may have to be independently monitored and adjustment made to the sensor reading to compensate for any variation.

FIGS. 8(a) and (b) illustrate graphically the elimination of the effect of temperature in making strain measurements using the apparatus of this invention. Both graphs, indicated generally be 200, 202, have set strain (measured in $\mu\varepsilon$) indicated along the respective horizontal axes plotted against measured strain (also measured in $\mu\varepsilon$) indicated along the vertical axes 208, 210. FIG. 8(a) depicts results obtained extracting strain information from single-parameter measurement of mean group delay ($\tau_{MGD}$) only. Points on the graph 200 representing values of set and measured strain are indicated by one of four symbols: circle 212, square 214, triangle 216 and inverted triangle 218. The symbol used indicates the temperature at which the respective skin measurement was taken. Measurements taken at nominally identical temperatures are shown connected by a solid line 220, dashed line 22, dotted line 224 and alternating dash/dot line 226. FIG. 8(b) also illustrates measured strain plotted against set strain, however in this case measured strain results are extracted from experimental measurement of both mean ($\tau_{MGD}$) and differential ($\tau_{DGD}$) group delay. Similar symbols as for FIG. 8(a) are used to mark measured positions. A sample set of points appear almost superimposed at a position 228.

The effect of using the parameters of mean and different group delay to discriminate between strain and temperature is apparent from a comparison of FIGS. 8(a) and 8(b). The four lines 220, 222, 224, 226 of FIG. 8(a) illustrate strain measurements made at four different temperatures. Results indicated by circles 212 are made at 20° C., those indicated by squares 214 are made at 35° C., those indicated by triangles 216 are made at 45° C. and those indicated by inverted triangles 218 are made at 55° C. The four lines 220, 222, 224, 226 connecting each respective temperature are well-separated indicating that temperature has a significant effect on values of strain derived from measurement of mean group delay only. FIG. 8(b), by contrast, shows the four representative symbols almost superimposed 228 when measured strain is derived from mean and differential group delay. Thus the cross-sensitivity of temperature and strain is substantially eliminated using the apparatus and method of this invention.

What is claimed is:

1. A sensor system (10) including interferometric means incorporating sensor and reference elements (12, 58) arranged to receive broadband radiation, means for introducing a variation in optical path difference (56) between a first optical path (140) incorporating the reference element and a second optical path (120) incorporating the sensor element, means for combining the light from the first and second optical paths (120, 140) to form interferograms and signal processing means (84) to process interferogram information
    characterised in that
        the sensor and reference elements (12, 58) are each arranged to support at least two different eigenmodes of radiation; the sensor system (10) is arranged to generate at least two interferograms therefrom; and the signal processing means (84) are arranged to extract optical group delay information from the interferograms and to derive temperature and/or strain data therefrom.

2. A sensor system (10) including interferometric means incorporating sensor and reference elements (12, 58) arranged to receive broadband radiation, means for introducing a variation in optical path difference (56) between a first optical (14) incorporating the reference element and a second optical path (120) incorporating the sensor element, means for combining the light from the first and second optical paths (120, 140) to form interferograms and signal processing means (84) to process interferogram information
    characterised in that
        the sensor and reference elements (12, 58) are each arranged to support at least two different eigenmodes of radiation; the sensor system (10) is arranged to generate at least two interferograms therefrom; and the signal processing means (84) are arranged to extract optical group delay information from the interferograms and to derive temperature and/or strain data from mean optical group delay and differential optical group delay obtained from the extracted interferogram information.

3. A sensor system (10) according to claim 1 characterised in that the sensor and reference elements (12, 58) each comprise an optical fibre (38, 58) which provides an optical path within each element.

4. A sensor system (10) according to claim 3 characterised in that the sensor and reference optical fibres (38, 58) are birefringent thereby constraining radiation to propagate in not more than two polarisation eigenmodes of the fibre.

5. A sensor system (10) according to claim 4 characterised in that the birefringence of the sensor and reference optical fibres (38, 58) is stress induced such that the birefringence is responsive to environmental temperature but is substantially unaffected by further application of stress.

6. A sensor system (10) according to claim 5 characterised in that the optical fibres (38. 58) are stress-induced highly birefringent (HiBi) fibres which substantially maintain the polarisation state of radiation propagating therein regardless of moderate external environmental variation.

7. A sensor system (10) according to claim 3, characterised in that the sensor element (12) comprises the sensor optical fibre (38) embedded within a composite material (40).

8. A sensor system (10) according to claim 1 characterised in that the reference element (58) and means for introducing a variation in optical path difference (56) are located in separate arms (50, 52) of an unbalanced Michelson interferometer (14) and further characterised in that the sensor element (38) can be considered as located in a third arm of a Michelson-style interferometer which also incorporates the unbalanced interferometer (14).

9. A sensor system (10) according to claim 8 characterised in that an output broadband interferogram from a Michelson-style interferometer is detected by a first detector (78) and communicated to signal processing means (84).

10. A sensor system (10) according to claim 3 characterised in that the sensor fibre (38) is bounded at light input end by a partially reflecting end (32) and at the opposing end by a mirror (36) arranged for reflection of light back into the fibre (38).

11. A sensor system (10) according to claim 10 characterised in that the reference fibre (58) is bounded at a light input end by a partially reflecting end (62) and at the opposing end by a mirror (64) arranged for reflection of light back into the fibre (58).

12. A sensor system (10) according to claim 4 characterised in that a polarisation controller (42) is located between the sensor element (12) and the reference element (58), the sensor fibre (38) and reference fibre (58) each support a fast eigenmode and a slow eigenmode of propagating radiation wherein the fast eigenmode propagates with a smaller index of refraction than that experienced by the slow eigenmode and the polarisation controller (42) is arranged to discriminate against the formation of any interferogram by light coupled into the fast eigenmode of one fibre (38, 58) interacting with light coupled into the slow eigenmode of the other fibre (58, 38).

13. A sensor system (10) according to claim 11 characterised in that the system (10) is arranged to form an $OPD_0$ broadband interferogram and further arranged for communication of the $OPD_0$ interferogram to a first detector (78), the aforesaid $OPD_0$ interferogram being associated with interference between light rays whose path difference is variable and controlled by the means for introducing a variation in optical path difference (56) and is independent of the environments surrounding the sensor and reference elements.

14. A sensor system (10) according to claim 13 characterised in that the means for introducing a variation in optical path difference (56) is a translatable mirror.

15. A sensor system (10) according to claim 13 characterised in that the means for introducing a variation in optical path difference (56) is an optical fibre of variable length.

16. A sensor system (10) according to claim 14 characterised in that the $OPD_0$ interferogram is formed from one component reflecting from the translatable mirror (56) and a second component reflecting from a partially reflecting end (62) of the reference fibre (58), said two components having zero path difference when the translatable mirror (56) is located in a central region of its translation range.

17. A sensor system (10) including an interferometer according to claim 13, characterised in that the interferometer is arranged to use the $OPD_0$ broadband interferogram to provide a reference group delay with respect to which group delays of further broadband interferograms are measured.

18. A sensor system (10) according to claim 1 characterised in that the means for introducing a variation in optical path difference (56) is calibrated with respect to the variation in optical path difference it provides.

19. A sensor system (10) according to claim 18 characterised in that a substantially monochromatic light source (28) is arranged such that narrowband radiation is coupled into the unbalanced Michelson interferometer (14) and thereby forms a fringe interference pattern which is detected by a second detector (82) and analysed by signal processing means (84).

20. A sensor system (10) according to claim 19 characterised in that the narrowband radiation interference fringes provide a calibration scale against which the variation in optical path difference is calibrated with respect to a physical variation of the means for introducing a variation in optical path difference (56).

21. A sensor system (10) according to claim 1 characterised in that it includes extracting means (Box 3) arranged to calculate the Fourier Transform of each interferogram profile and to extract the respective interferogram group delay therefrom.

22. A sensor system (10) according to claim 21 characterised in that the extracting means (Box 3) is arranged to extract interferogram phase information by Fast Fourier Transform and Dispersive Fourier Transform Spectroscopy and to calculate the group delay of each interferogram from said phase information.

23. A sensor system (10) according to claim 1 characterized in that the system (10) is arranged to form interferograms between light coupled into the fast eigenmode of the sensor element (12) and light coupled into the fast eigenmode of the reference element (58) and between light coupled into the slow eigenmode of the sensor element (12) and light coupled into the slow eigenmode of the reference element (58); the sensor element (12) is arranged to be subject to a plurality of predetermined conditions of strain and temperature and thereby provide data from which to derive a transformation relating mean and differential group delays of the aforesaid interferograms to applied conditions of strain and temperature.

24. A sensor system (10) according to claim 23 characterised in that the system (10) is arranged to apply the transformation relating mean and differential group delays to applied conditions of strain and temperature to determination of unknown conditions of strain and temperature by measurement of mean and differential group delays.

25. A sensor system (10) according to claim 1 characterised in that the signal processing means (84) is arranged to:

(1) extract (Box 3) the group delay of each broadband interferogram from the signals received by the detector (78);

(2) apply (Boxes 2, 4 and 5) calibration and zero optical path difference corrections in order to calculate mean group delay and differential group delay of the broadband interferograms arising from optical path differences between ray paths through the reference and sensor elements (58, 12);

(3) derive (Box 6) a relationship between mean and differential group delays experimentally obtained from the sensor system (10) and predetermined conditions of temperature and strain;

(4) apply (Box 7) the derived relationship to experimentally obtained mean and differential group delays and thereby render the sensor system (10) capable of simultaneous measurement of strain and temperature in unknown environmental conditions.

26. A sensor system (10) according to claim 1 characterised in that the sensor element (12) is mounted in a structure for measurement of strain and temperature within the structure.

27. A sensor system (10) according to claim 1 characterised in that the sensor element (12) and reference element (58) are detachable from each other and capable of attachment to other sensor elements or reference elements.

28. A sensor system (10) according to claim 27 wherein the sensor element (12) is embedded within a structure characterised in that the other sensor elements are embedded within different structures or at other positions within the same structure.

29. A sensor system (10) according to claim 1 characterised in that the sensor element (12) is subdivided into sub-elements by a series of partially reflecting mirrors along its length, the second optical path (120) comprises a series of optical paths each corresponding to reflection at a different partially reflecting mirror and the means for introducing a variation in optical path difference (56) provides for formation of a series of interferogram pairs each pair corresponding to a difference between the first optical path (140) and a respective optical path of said series such that temperature and strain information derived therefrom corresponds to environmental conditions at each sensor sub-element.

30. A method of simultaneous measurement of strain and temperature comprising the steps of:

(a) arranging for a dual-eigenmode optical sensor element (12) incorporating a high birefringence optical fibre situated in one arm of a Michelson-style interferometer to be in an environment of unknown strain and temperature;

(b) forming at least two branched interferograms between light travelling a first optical path (120) incorporating the dual-eigenmode sensor element (12) and light travelling a second optical path (140) incorporating a dual-eigenmode reference element (58), one of the optical paths (120, 140) being variable relative to the other;

(c) determining the variation of optical path difference within each broadband interferogram;

(d) extracting values of group delay from the broadband interferograms formed in Step (b) relative to a predetermined reference group delay;

(e) calculating mean group delay and differential group delay from the extracted values of group delay;

(f) deriving deconvolved values for the unknown strain and temperature conditions of the environment of the sensor element (12) by applying a predetermined transformation of the mean group delay and differential group delay.

31. A method according to claim 30 wherein the predetermined transformation is determined by:

(a) arranging for the dual-eigenmode optical sensor element (12) to be located in an environment of predetermined strain and temperature;

(b) following Steps (b) to (e) of claim 30;

(c) deriving a relationship between the predetermined values of strain and temperature of the environment of the sensor element (12) and the values of mean group delay and differential group delay obtained experimentally in Step (b) and thereby deriving the predetermined transformation of claim 30, Step (f).

32. A method according to claim 30 wherein the predetermined reference group delay is determined by forming a further broadband interferogram having a characteristic optical path difference which is independent of the environments of the sensor and reference elements (12, 58) and dependent on variations in the optical path.

33. A method according to claim 30, wherein the variation of optical path difference within each broadband interferogram is determined by:

(a) forming a narrowband interferogram having a characteristic optical path difference which is dependent on the variable optical path;

(b) calibrating the variable optical path with respect to the narrowband interferogram in order to determine variation in characteristic optical path difference of broadband interferograms.

* * * * *